US010069816B2

(12) United States Patent
Hu et al.

(10) Patent No.: US 10,069,816 B2
(45) Date of Patent: Sep. 4, 2018

(54) AUTHENTICATION SERVER TESTING METHOD AND SYSTEM

(71) Applicant: China IWNCOMM Co., LTD., Xi'an, Shaanxi (CN)

(72) Inventors: Ya'nan Hu, Shaanxi (CN); Bianling Zhang, Shaanxi (CN); Qianjun Shi, Shaanxi (CN); Guobing Yuan, Shaanxi (CN)

(73) Assignee: China IWNCOMM Co., LTD., Xi'an, Shaanxi (CN)

( * ) Notice: Subject to any disclaimer, the term of this patent is extended or adjusted under 35 U.S.C. 154(b) by 93 days.

(21) Appl. No.: 14/914,577

(22) PCT Filed: Jul. 30, 2014

(86) PCT No.: PCT/CN2014/083280
§ 371 (c)(1),
(2) Date: Feb. 25, 2016

(87) PCT Pub. No.: WO2015/039498
PCT Pub. Date: Mar. 26, 2015

(65) Prior Publication Data
US 2016/0205090 A1    Jul. 14, 2016

(30) Foreign Application Priority Data

Sep. 17, 2013  (CN) .......................... 2013 1 0425993

(51) Int. Cl.
*H04L 29/06* (2006.01)
*H04L 12/26* (2006.01)
(Continued)

(52) U.S. Cl.
CPC .......... *H04L 63/0823* (2013.01); *H04L 43/50* (2013.01); *H04W 12/06* (2013.01); *H04W 84/12* (2013.01)

(58) Field of Classification Search
CPC ... G06F 2221/034; H04L 63/00; H04L 63/20; H04L 63/0823; H04L 43/50;
(Continued)

(56) References Cited

U.S. PATENT DOCUMENTS

2009/0013378 A1* 1/2009 Zhang ..................... H04L 43/50
726/1
2009/0327812 A1* 12/2009 Zhang ................. H04L 63/0823
714/32
(Continued)

FOREIGN PATENT DOCUMENTS

CN    1812417 A    8/2006
CN    1812418 A    8/2006
(Continued)

OTHER PUBLICATIONS

Liang et al. Study of WAPI Technology and Security, 2010, 4 Pages (Year: 2010).*
(Continued)

*Primary Examiner* — Farid Homayounmehr
*Assistant Examiner* — Christopher C Harris
(74) *Attorney, Agent, or Firm* — Wolf, Greenfield & Sacks, P.C.

(57) ABSTRACT

A method and a system for testing an authentication server. The method comprises: installing a certificate of an authentication server to be tested in a monitor console and installing a certificate of the monitor console in the authentication server to be tested; constructing and sending, by the monitor console, based on a configuration type of the authentication server to be tested, according to a roaming authentication protocol, roaming authentication protocol data to the authentication server to be tested; capturing response data sent by the authentication server to be tested, and performing comparative analysis to determine whether field information in
(Continued)

the response data is consistent with locally stored respective information; and displaying that the authentication server to be tested is tested successfully in a case that the field information in the response data is completely consistent with the locally stored respective information; otherwise, displaying comparative analysis information.

10 Claims, 4 Drawing Sheets

(51) Int. Cl.
*H04W 12/06* (2009.01)
*H04W 84/12* (2009.01)

(58) Field of Classification Search
CPC .. H04L 2209/80; H04W 12/06; H04W 24/08; H04W 88/08
See application file for complete search history.

(56) References Cited

U.S. PATENT DOCUMENTS

| | | |
|---|---|---|
| 2011/0055561 A1 | 3/2011 | Lai et al. |
| 2011/0055569 A1* | 3/2011 | Zhang ................. H04L 63/0823 713/170 |
| 2011/0238996 A1 | 9/2011 | Xiao et al. |

FOREIGN PATENT DOCUMENTS

| | | |
|---|---|---|
| CN | 103442383 A | 12/2013 |
| EP | 1852999 A1 | 11/2007 |
| EP | 1990958 A1 | 11/2008 |
| EP | 1990972 A1 | 11/2008 |
| JP | 2008-530919 A | 8/2008 |
| JP | 2009-181358 A | 8/2009 |
| JP | 2009-528730 A | 8/2009 |
| KR | 2007-0122460 A | 12/2007 |

OTHER PUBLICATIONS

Wu et al, Security Analysis of WAPI Authentication and Key Exchange Protocol, 2011, 9 Pages (Year: 2011).*
Park, On Certificated-Based Security Protocols for Wireless Mobile Communication Systems, 1997 Dankook University, 6 Pages (Year: 1997).*
Japanese Office Action for Application No. JP 2016-541780 dated Apr. 25, 2017.
Korean Office Action for Application No. KR 10-2016-7008762 dated May 19, 2017.
International Search Report, dated Oct. 10, 2014, from corresponding International Application No. PCT/CN2014.
Extended European Search Report, dated Aug. 24, 2016, from related European Application No. 14845212.1.
Chinese National Body: "WAPI TechnologyOverview—CNB contributionfor the Beijing meeting, Aug. 8-12".

* cited by examiner

AUTHENTICATION SERVER TESTING METHOD AND SYSTEM

This application claims is the national phase of International Application No. PCT/CN2014/083280, titled "AUTHENTICATION SERVER TESTING METHOD AND SYSTEM", filed on Jul. 30, 2014, which claims priority to Chinese Patent Application No. 201310425993.2, titled "AUTHENTICATION SERVER TESTING METHOD AND SYSTEM", filed with the Chinese State Intellectual Property Office on Sep. 17, 2013, both of which are incorporated herein by reference in entirety.

FIELD

The disclosure relates to the technical field of communications, and in particular to a method and a system for testing an authentication server.

BACKGROUND

Types of service based on the IP network become increasingly various, and involve national economy and all aspects of society. A wireless IP network transmits data via radio wave so that the openness of the physical network reaches a new level. Therefore, secure access has become a key issue for the safe operation of a wired network and a wireless network.

A secure access system of the IP network mainly includes three network entities: a network terminal, an access point and an authentication server. The network terminal makes a request of accessing a network to enjoy various resources provided by the network. The access point is an edge device of the IP interconnection network and an entity to provide access service to a network user. The authentication server is an entity to provide a service of user identity authentication.

National standard for a wireless local area network is promulgated and implemented in 2003, an authentication mechanism is implemented with a WAPI protocol, and then the broadband wireless IP standard working group promulgates an extended roaming protocol specification.

Currently, the testing system of a product certification protocol in a wireless local network field mainly includes an interoperability testing system of WI-FI alliance for IEEE802.11 standard. The system verifies the correctness of protocol implementation in a device to be tested by testing the communication performance and the interoperability between the device to be tested and a reference device, that is, the system tests a protocol conformance. The testing system has the following disadvantages: the completeness of testing the device is not high in a case that the device is tested in a typical application environment that is the interoperability of a higher layer protocol, and there may be deviation of a test result. The testing process is an interoperability testing which is similar to a black box testing, which only focuses on whether a final test result is successful; the testing process cannot be known, error location information in a case that the test is not passed cannot be given, and the accuracy of the test result may be affected seriously due to the correctness of the reference device implementation.

SUMMARY

In order to solve the above-described technical issue, a method and a system for testing an authentication server are provided according to embodiments of the disclosure, which can be used to test an authentication server produced by equipment manufacturers for the correctness and the conformance of implementing a roaming authentication protocol, with which roaming authentication protocol data is sent to the authentication server to be tested by simulating an access point and the authentication server, response data sent by the authentication server to be tested is captured, and the response data is analyzed in detail, so as to ensure that a product passing the test fully complies with the provisions of the wireless local network national standard and the interoperability. The test result is accurate, test data is complete, and error location can be performed.

A method for testing an authentication server is provided according to the present disclosure, which includes:

installing a certificate of an authentication server to be tested in a monitor console and installing a certificate of the monitor console in the authentication server to be tested;

constructing and sending, by the monitor console, based on a configuration type of the authentication server to be tested, according to a roaming authentication protocol, roaming authentication protocol data to the authentication server to be tested;

capturing, by the monitor console, response data sent by the authentication server to be tested, and performing, by the monitor console, comparative analysis to determine whether field information in the response data is consistent with locally stored respective information; and displaying that the authentication server to be tested is tested successfully in a case that the field information in the response data is completely consistent with the locally stored respective information; otherwise, displaying, by the monitor console, comparative analysis information.

A system for testing an authentication server is further provided according to the present disclosure, which includes:

a monitor console, including a certificate installation unit and a monitoring and processing unit, where the certificate installation unit is configured to install a certificate of an authentication server to be tested;

the monitoring and processing unit is configured to construct and send, based on a configuration type of the authentication server to be tested, according to a roaming authentication protocol, roaming authentication protocol data to the authentication server to be tested; capture response data sent by the authentication server to be tested, and perform comparative analysis to determine whether field information in the response data is consistent with the locally stored respective information; and display that the authentication server to be tested is tested successfully in a case that the field information in the response data is completely consistent with the locally stored respective information; otherwise, the monitoring and processing unit displays comparative analysis information.

It can be seen from the above-described embodiments that, a method and a system for testing an authentication server are provided according to the embodiments of the present disclosure. A certificate of an authentication server to be tested is installed in a monitor console and a certificate of the monitor console is installed in the authentication server to be tested; the monitor console constructs and sends, based on a configuration type of the authentication server to be tested, according to a roaming authentication protocol, roaming authentication protocol data to the authentication server to be tested; the monitor console captures response data sent by the authentication server to be tested, and performs comparative analysis to determine whether field information in the response data is consistent with locally stored respective information; and the monitor console displays that the authentication server to be tested is tested successfully in a case that the field information in the response data is completely consistent with the locally stored respective information; otherwise, the monitor console displays comparative analysis information. It can be seen from the present disclosure, the monitor console sends the roaming authentication protocol data to the authentication server to be tested by simulating an access point and the authentication server, captures the response data sent by the authentication server to be tested, performs comparative analysis on the response data, determines whether the testing is successful, and displays the comparative analysis information in a case that the testing is unsuccessful, and thus error location can be performed accurately. Hence, compared with the conventional technology, the present disclosure has the following advantages: the related protocol data is captured and completely analyzed so that a test result is more accurate; a testing process includes a complete data capturing analysis, detailed information on the protocol data in the device to be tested may be given so that test data is more complete; and a microtest is performed on an execution process of the protocol so that an error in protocol implementation may be located accurately.

BRIEF DESCRIPTION OF THE DRAWINGS

The drawings to be used in the description of embodiments of the disclosure or the conventional technology are described briefly as follows, so that technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

DETAILED DESCRIPTION

To make the above objects, features and advantages of the disclosure more apparent and easier to be understood, hereinafter specific embodiments of the disclosure are illustrated in detail in conjunction with the drawings.

First Embodiment

Figure 1:
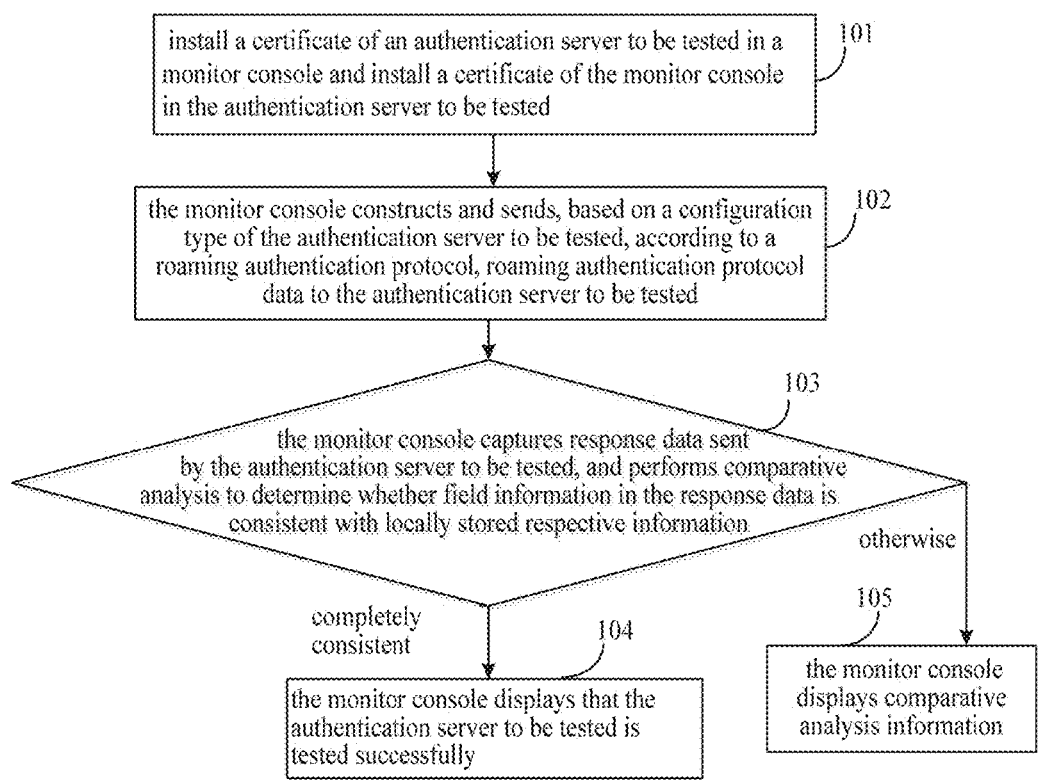
FIG. 1 is a method flowchart of a method for testing an authentication server according to a first embodiment of the present disclosure.

Referring to FIG. 1, FIG. 1 is a method flowchart of a method for testing an authentication server according to a first embodiment of the present disclosure. The method includes steps 101 to 105.

In step 101, a certificate of an authentication server to be tested is installed in a monitor console and a certificate of the monitor console is installed in the authentication server to be tested. The installation is used to build a trust relationship between the monitor console and the authentication server to be tested.

In step 102, the monitor console constructs and sends roaming authentication protocol data to the authentication server to be tested, based on a configuration type of the authentication server to be tested, according to a roaming authentication protocol. The configuration type of the authentication server to be tested includes a home authentication server, an access authentication server and a center authentication server.

In step 103, the monitor console captures response data sent by the authentication server to be tested, and performs comparative analysis to determine whether field information in the response data is consistent with locally stored respective information.

In step 104, the monitor console displays that the authentication server to be tested is tested successfully in a case that the field information in the response data is completely consistent with the locally stored respective information.

In step 105, the monitor console displays comparative analysis information in a case that the field information in the response data is not completely consistent with the locally stored respective information.

Preferably, the constructing and sending, by the monitor console, based on a configuration type of the authentication server to be tested, according to a roaming authentication protocol, roaming authentication protocol data to the authentication server to be tested in step 102 may include:

constructing, by the monitor console, based on the configuration type of the authentication server to be tested, a roaming certificate authentication request message, or, constructing and sending, by the monitor console, a certificate authentication request message to the authentication server to be tested. The configuration type of the authentication server to be tested includes a home authentication server, an access authentication server and a center authentication server.

Preferably, the capturing, by the monitor console, response data sent by the authentication server to be tested, and performing, by the monitor console, comparative analysis to determine whether field information in the response data is consistent with locally stored respective information in step 103 may include:

capturing, by the monitor console, a roaming certificate authentication response message sent by the authentication server to be tested, or, capturing, by the monitor console, a roaming certificate authentication request message sent by the authentication server to be tested; and performing, by the monitor console, comparative analysis to determine whether field information in the roaming certificate authentication response message is consistent with locally stored respective information, and/or, performing, by the monitor console, comparative analysis to determine whether field information in the roaming certificate authentication request message is consistent with locally stored respective information.

It can be seen from the above-described embodiment that, according to the present disclosure, the monitor console sends the roaming authentication protocol data to the authentication server to be tested by simulating an access point and the authentication server, captures the response data sent by the authentication server to be tested, performs comparative analysis on the response data, determines whether the testing is successful, and displays the comparative analysis information in a case that the testing is unsuccessful, and thus error location can be performed accurately. Hence, compared with the conventional technology, the present disclosure has the following advantages: the related protocol data is captured and completely analyzed so that a test result is more accurate; a testing process includes a complete data capturing analysis, detailed information on the protocol data in the device to be tested may be given so that test data is more complete; and a microtest is performed on an execution process of the protocol so that an error in protocol implementation may be located accurately.

Second Embodiment

Figure 2:
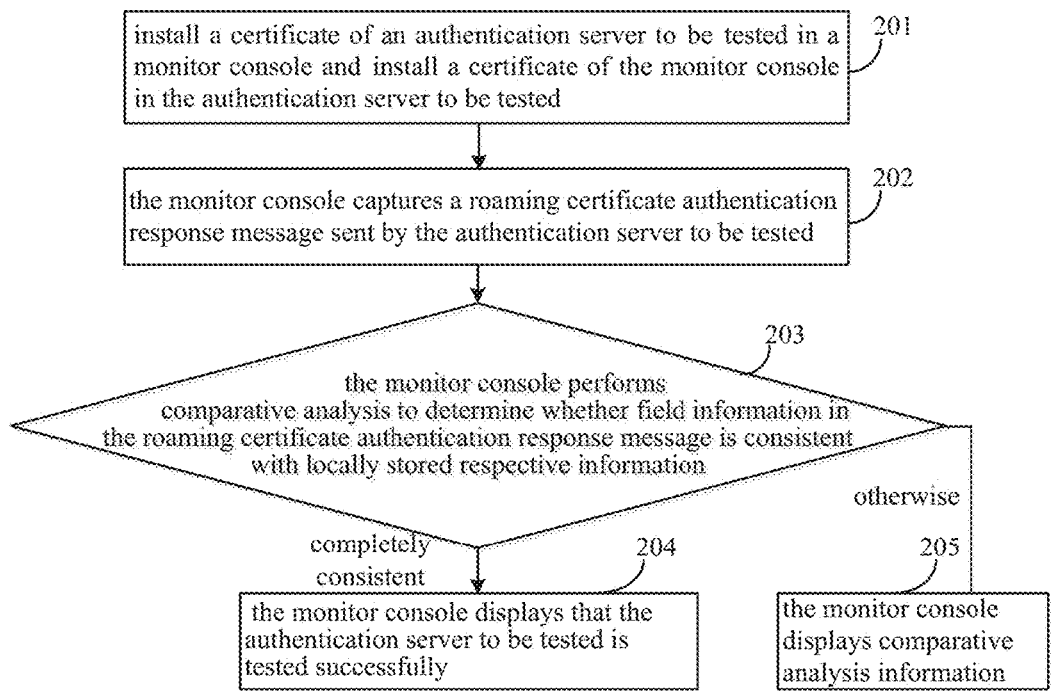
FIG. 2 is a method flowchart of a method for testing an authentication server according to a second embodiment of the present disclosure.

A method for testing an authentication server according to the present disclosure is explained with a specific application scenario. For the method for testing the authentication server, a method flowchart of a method for testing an authentication server as shown in FIG. 2 may be referred to, in a case that the authentication server to be tested is configured to be a home authentication server. The method includes steps 201 to 205.

In step 201, the monitor console constructs and sends a roaming certificate authentication request message to the authentication server to be tested.

In step 202, the monitor console captures a roaming certificate authentication response message sent by the authentication server to be tested.

Preferably, the roaming certificate authentication request message may include: an identity of an authentication server (AS) trusted by a terminal, an authenticator entity (AE) inquiry, an authentication supplicant entity (ASUE) inquiry, a certificate of an authentication supplicant entity, a certificate of the authenticator entity, a certificate authentication result of the authenticator entity, a certificate of an access authentication service unit (ASU), an extended attribute, a message authentication and other fields, where the message authentication field is a signature by calculating a private key corresponding to a certificate of the monitor console which is installed in the authentication server to be tested.

In step 203, the monitor console performs comparative analysis to determine whether field information in the roaming certificate authentication response message is consistent with locally stored respective information.

Preferably, the roaming certificate authentication response message may include: an identity of an access authentication server, a verification result of a certificate, a server signature trusted by the authentication supplicant entity, the certificate of the access authentication service unit, a server signature trusted by the authentication supplicant entity, the extended attribute, the message authentication and other fields.

Preferably, step 203 may include:

checking, by the monitor console, whether a WAI version number of the roaming certificate authentication response message complies with the wireless local network national standard;

checking, by the monitor console, whether a name of an access AS in the roaming certificate authentication response message is consistent with a name of a holder of an access AS certificate which is installed in an AP;

performing comparative analysis, by the monitor console, to determine whether a field content of a terminal certificate of a field of a certificate verification result in the roaming certificate authentication response message is the same as content of locally stored terminal certificate, and checking whether a value of a code field of the verification result of a certificate of the terminal is valid;

performing comparative analysis, by the monitor console, to determine whether the certificate of the access ASU in roaming certificate authentication response message is the same as a certificate of the access ASU in the roaming certificate authentication request message sent by the monitor console;

performing comparative analysis, by the monitor console, to determine whether content of a certificate field in content of a message authentication field in the roaming certificate authentication response message is consistent with content of an AS certificate which is installed in the monitor console and trusted by the client; and verifying, by the monitor console, whether a signature field of the content of the message authentication field in the roaming certificate authentication response message and a signature field ahead the message authentication field in the roaming certificate authentication response message are correct. The signature value is validated by using a public key of the installed certificate of an authentication server to be tested.

In step 204, the monitor console displays that the authentication server to be tested is tested successfully in a case that all the field information is consistent with the locally stored respective information.

In step 205, the monitor console displays comparative analysis information in a case that not all the field information is consistent with the locally stored respective information.

It can be seen from the above-described embodiment that, in a case that the authentication server to be tested is configured to be a home authentication server, the monitor console constructs and sends the roaming certificate authentication request message to the authentication server to be tested by simulating an access point, captures the roaming certificate authentication response message sent by the authentication server to be tested, and performs comparative analysis to determine whether field information in the roaming certificate authentication response message is consistent with the locally stored respective information. In this way of analyzing the response data, the test result is more accurate, test data is more complete, and error location can be performed accurately. The above-described testing method can ensure that a server passing the testing can fully comply with the wireless local network national standard and the interoperability.

Third Embodiment

Figure 3:
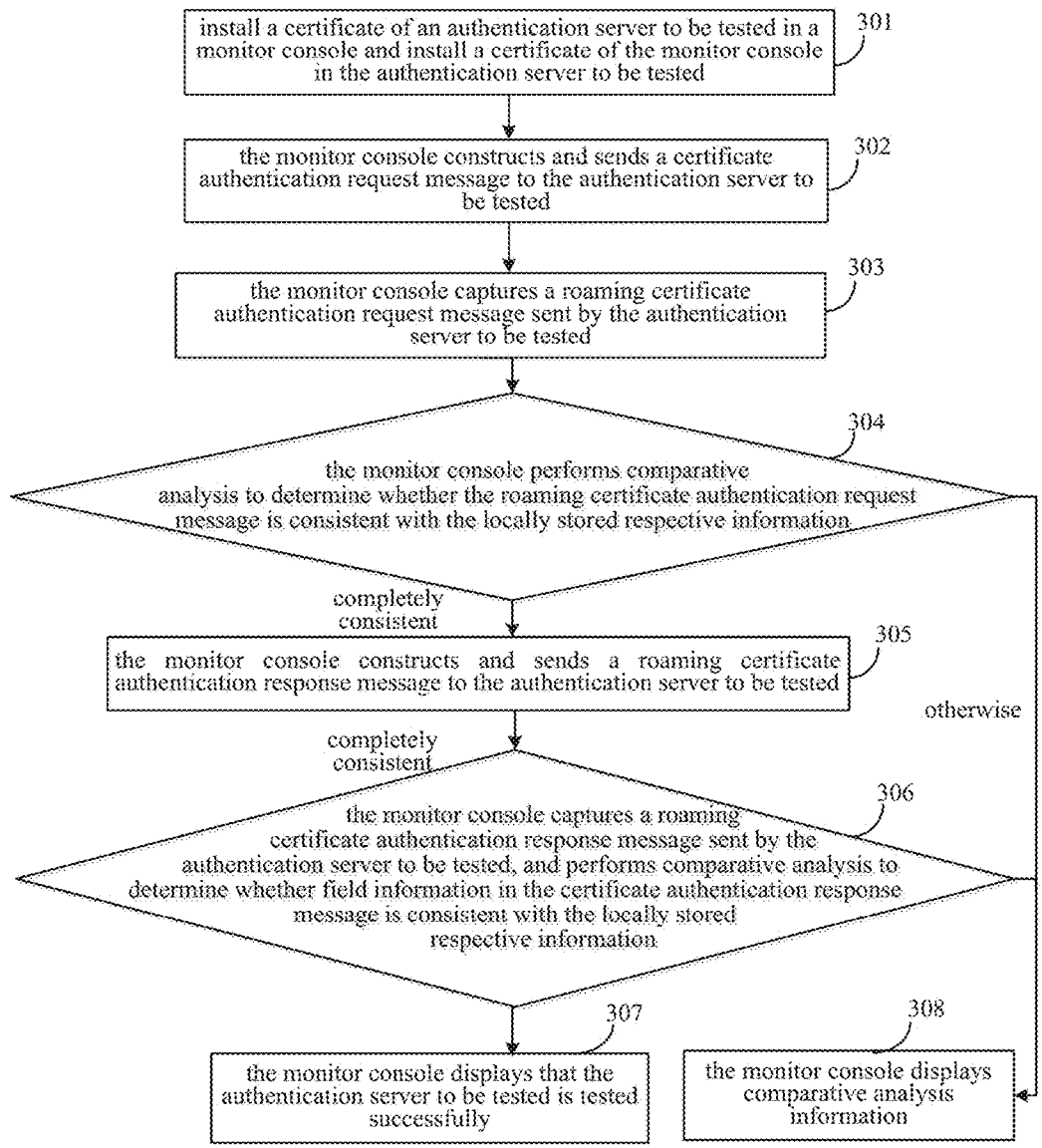
FIG. 3 is a method flowchart of a method for testing an authentication server according to a third embodiment of the present disclosure.

A method for testing an authentication server according to the present disclosure is explained with a specific application scenario. For the method for testing the authentication server, a method flowchart of a method for testing an authentication server as shown in FIG. 3 may be referred to, in a case that the authentication server to be tested is configured to be an access authentication server. The method includes steps 301 to 308.

In step 301, a certificate of an authentication server to be tested is installed in a monitor console and a certificate of the monitor console is installed in the authentication server to be tested.

In step 302, the monitor console constructs and sends a certificate authentication request message to the authentication server to be tested.

In step 303, the monitor console captures a roaming certificate authentication request message sent by the authentication server to be tested.

In step 304, the monitor console performs comparative analysis to determine whether the roaming certificate authentication request message is consistent with locally stored respective information.

Preferably, step 304 may include: checking, by the monitor console, whether a WAI version number of the roaming certificate authentication request message complies with the wireless local network national standard;

performing comparative analysis, by the monitor console, to determine whether a name of an authentication server trusted by a terminal in the roaming certificate authentication request message is consistent with a name of a holder of a certificate of an authentication server which is installed in the monitor console and trusted by a terminal;

performing comparative analysis, by the monitor console, to determine whether a certificate of an STAasue in the roaming certificate authentication request message is consistent with a certificate of a terminal user which is installed in the monitor console;

performing comparative analysis, by the monitor console, to determine whether a certificate of an STAae in the roaming certificate authentication request message is consistent with a certificate of a user of an access point (AP) which is installed in the monitor console;

performing comparative analysis, by the monitor console, to determine whether a certificate of an access authentication server unit in the roaming certificate authentication request message is consistent with a certificate of an authentication service unit which is installed in the monitor console and trusted by the AP;

performing comparative analysis, by the monitor console, to determine whether a certificate field of a content field of a message authentication in the roaming certificate authentication request message is consistent with the certificate of the authentication service unit which is installed in the monitor console and trusted by the AP; and verifying, by the monitor console, to determine whether a signature filed of the content field of the message authentication in the roaming certificate authentication request message and a field ahead the message authentication field in the roaming certificate authentication request message are correct.

In step 305, the monitor console constructs and sends a roaming certificate authentication response message to the authentication server to be tested in a case that all the field information is consistent with the locally stored respective information; otherwise, step 308 is executed.

In step 306, the monitor console captures the roaming certificate authentication response message sent by the authentication server to be tested, and performs comparative analysis to determine whether the field information in the certificate authentication response message is consistent with the locally stored respective information.

Preferably, the performing comparative analysis to determine whether field information in the certificate authentication response message is consistent with the locally stored respective information in step 306 may include:

checking, by the monitor console, whether a WAI version number of the certificate authentication response message complies with the wireless local network national standard;

performing comparative analysis, by the monitor console, to determine whether content of a terminal certificate field in a certificate authentication result information field in the certificate authentication response message is the same as content of locally stored terminal certificate, and checking whether a code field of a verification result of the terminal certificate is valid;

performing comparative analysis, by the monitor console, to determine whether content of an access point certificate field in the certificate authentication result information field in the certificate authentication response message is the same as content of locally stored access point certificate, and checking whether a code field of a verification result of the access point certificate is valid; and verifying, by the monitor console, whether a signature field of a server trusted by an authenticator entity in the certificate authentication response message and a data field ahead the signature field are correct.

In step 307, the monitor console displays that the authentication server to be tested is tested successfully in a case that all the field information is consistent with the locally stored respective information.

In step 308, the monitor console displays comparative analysis information in a case that not all the field information is consistent with the locally stored respective information.

It can be seen from the above-described embodiment that, in a case that the authentication server to be tested is configured to be an access authentication server, the monitor console constructs the certificate authentication request message by simulating the access point, captures a roaming certificate authentication request message sent by the authentication server to be tested, performs comparative analysis to determine whether the field content of the roaming certificate authentication request message is consistent with the locally stored respective information. In a case that the field information is completely consistent with the locally stored respective information, the monitor console constructs and sends a roaming certificate authentication response message to the authentication server to be tested, captures the certificate authentication response message sent by the authentication server to be tested, and performs comparative analysis to determine whether the certificate authentication response message is consistent with the locally stored respective information. By performing comparative analysis on the response data in the authentication server to be tested twice, it is tested accurately whether the authentication server to be tested complies with the wireless local network national standard and the interoperability. In this way of analyzing the response data, the test result is more accurate, test data is more complete, and error location can be performed accurately.

Fourth Embodiment

Figure 4:
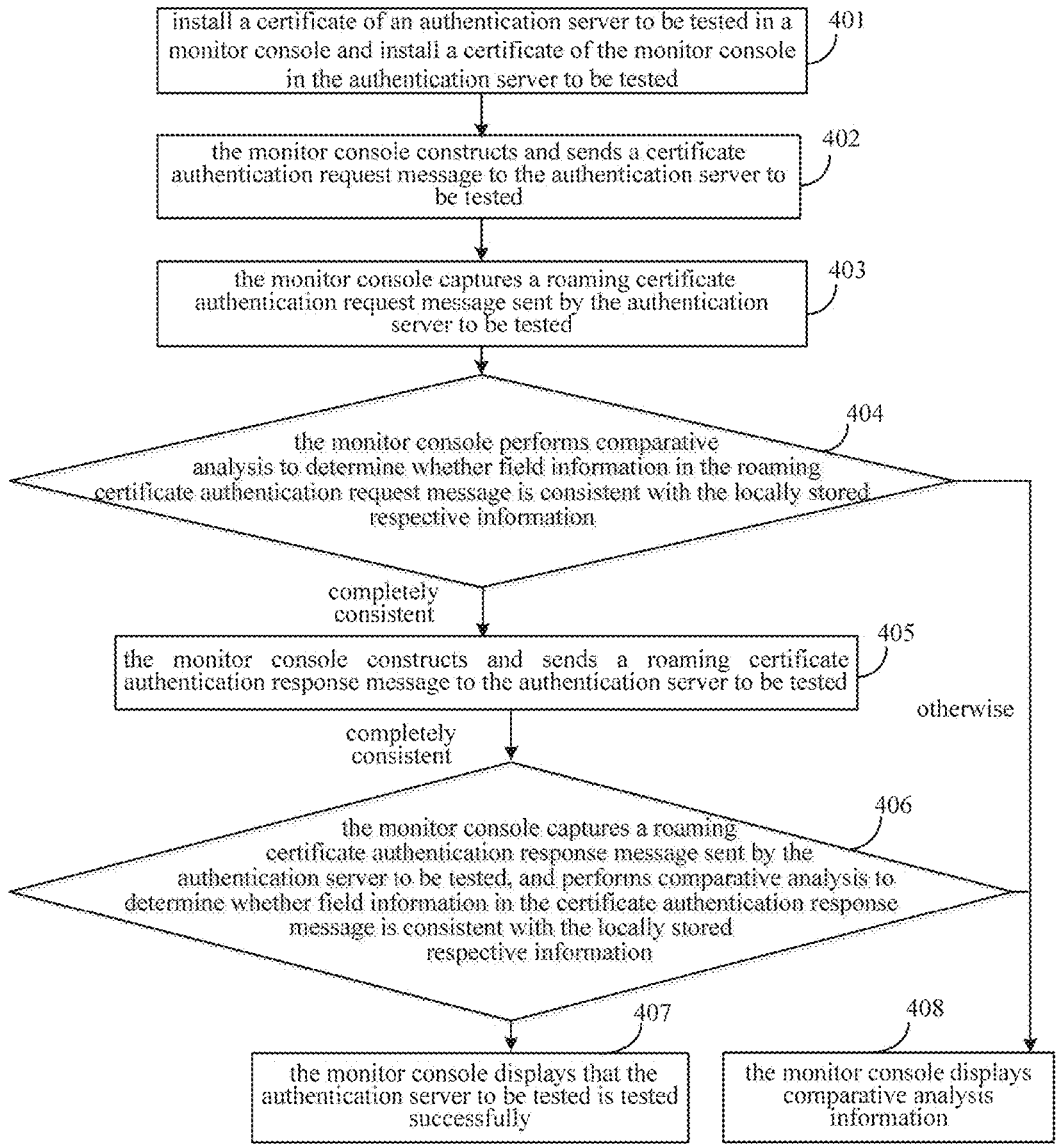
FIG. 4 is a method flowchart of a method for testing an authentication server according to a fourth embodiment of the present disclosure.

A method for testing an authentication server according to the present disclosure is explained with a specific application scenario. For the method for testing the authentication server, a method flowchart of a method for testing an authentication server as shown in FIG. 4 may be referred to, in a case that the authentication server to be tested is configured to be a center authentication server. The method includes steps 401 to 408.

In step 401, a certificate of an authentication server to be tested is installed in a monitor console and a certificate of the monitor console is installed in the authentication server to be tested.

In step 402, the monitor console constructs and sends a roaming certificate authentication request message to the authentication server to be tested.

In step 403, the monitor console captures a roaming certificate authentication request message sent by the authentication server to be tested.

In step 404, the monitor console performs comparative analysis to determine whether field information in the captured roaming certificate authentication request message is consistent with the locally stored respective information.

Preferably, step 404 may include:

checking whether a WAI version number of the roaming certificate authentication request message complies with the wireless local network national standard;

performing comparative analysis to determine whether a name of an authentication server trusted by a terminal in the roaming certificate authentication request message is consistent with a name of a holder of a certificate of an authentication server which is installed in the monitor console and trusted by a terminal;

performing comparative analysis, by the monitor console, to determine whether an ADDID field in the roaming certificate authentication request message is consistent with an ADDID field in the roaming certificate authentication request message sent by the monitor console to the authentication server to be tested;

performing comparative analysis, by the monitor console, to determine whether an authenticator entity inquiry field in the roaming certificate authentication request message is consistent with an authenticator entity inquiry field in the roaming certificate authentication request message sent by the monitor console to the authentication server to be tested;

performing comparative analysis, by the monitor console, to determine whether an ASUE inquiry field in the roaming certificate authentication request message is consistent with an ASUE inquiry field in the roaming certificate authentication request message sent by the monitor console to the authentication server to be tested;

performing comparative analysis, by the monitor console, to determine whether a field of a certificate of an STAasue in the roaming certificate authentication request message is consistent with a certificate of a terminal user which is installed in the monitor console;

performing comparative analysis, by the monitor console, to determine whether the field of the certificate of the STAae in the roaming certificate authentication request message is consistent with a certificate of a user of an AP which is installed in the monitor console;

performing comparative analysis, by the monitor console, to determine whether an authentication result of the certificate of the STAae in the roaming certificate authentication request message is consistent with an authentication result of a certificate of an STAae in the roaming certificate authentication request message sent by the monitor console to the authentication server to be tested;

performing comparative analysis, by the monitor console, to determine whether a field of a certificate of an access ASU in the roaming certificate authentication request message is consistent with a certificate of an authentication server trusted by an AP which is installed in the monitor console; and performing comparative analysis, by the monitor console, to determine whether a message authentication field in the roaming certificate authentication request message is consistent with a message authentication field in the roaming certificate authentication request message sent by the monitor console to the authentication server to be tested.

In step 405, the monitor console constructs and sends a roaming certificate authentication response message to the authentication server to be tested in a case that all the field information is consistent with the locally stored respective information; otherwise, step 408 is executed.

In step 406, the monitor console captures the roaming certificate authentication response message sent by the authentication server to be tested, and performs comparative analysis to determine whether the field information in the captured certificate authentication response message is consistent with the locally stored respective information.

Preferably, the step 406 may include:

checking, by the monitor console, whether a WAI version number of the roaming certificate authentication response message complies with the standard;

checking, by the monitor console, whether a name of an access authentication server in the roaming certificate authentication response message is consistent with a name of a holder of a certificate of an authentication server which is installed in the monitor console and trusted by an AP;

performing comparative analysis, by the monitor console, to determine whether an ADDID field in the roaming certificate authentication response message is consistent with an ADDID field in the roaming certificate authentication response message sent by the monitor console to the authentication server to be tested;

performing comparative analysis, by the monitor console, to determine whether a field of a certificate verification result in the roaming authentication response message is consistent with a field of a certificate verification result in the roaming authentication response message sent by the monitor console to the authentication server to be tested; and performing comparative analysis, by the monitor console, to determine whether a field of a first signature of a server trusted by an authentication supplicant entity in the roaming certificate authentication response message is consistent with a field of a first signature of a server trusted by an authentication supplicant entity in the roaming certificate authentication response message sent by the monitor console to the authentication server to be tested.

The monitor console performs comparative analysis to determine whether a field of a certificate of an access ASU in the roaming certificate authentication response message is consistent with a certificate of an AS trusted by an AP which is installed in the monitor console.

The monitor console performs comparative analysis to determine whether a field of a second signature of a server trusted by an authentication supplicant entity in the roaming certificate authentication response message is consistent with a field of a second signature of a server trusted by an authentication supplicant entity in the roaming certificate authentication response message sent by the monitor console to the authentication server to be tested.

The monitor console performs comparative analysis to determine whether a message authentication field in the roaming certificate authentication response message is consistent with a message authentication field in the roaming certificate authentication response message sent by the monitor console to the authentication server to be tested.

In step 407, the monitor console displays that the authentication server to be tested is tested successfully in a case that all the field information is consistent with the locally stored respective information.

In step 408, the monitor console displays comparative analysis information in a case that not all the field information is consistent with the locally stored respective information.

It can be seen from the above-described embodiment that, in a case that the authentication server to be tested is configured to be the center authentication server, the monitor console constructs the roaming certificate authentication request message by simulating the access authentication server, captures a roaming certificate authentication request message sent by the authentication server to be tested, performs comparative analysis to determine whether the field content of the roaming certificate authentication request message is consistent with the locally stored respective information. In a case that the field information is completely consistent with the locally stored respective information, the monitor console constructs and sends a roaming certificate authentication response message to the authentication server to be tested, captures the roaming certificate authentication response message sent by the authentication server to be tested, and performs comparative analysis to determine whether the field content of in the roaming certificate authentication response message is consistent with the locally stored respective information. By performing comparative analysis on the response data in the authentication server to be tested twice, it is tested accurately whether the authentication server to be tested complies with the wireless local network national standard and the interoperability. In this way of analyzing the response data, the test result is more accurate, test data is more complete, and error location can be performed accurately.

Fifth Embodiment

For the method for testing an authentication server according to the first embodiment, a system for testing an authentication server is provided according to the fifth embodiment, which includes:

a monitor console, including a certificate installation unit and a monitoring and processing unit, where the certificate installation unit is configured to install a certificate of an authentication server to be tested;

the monitoring and processing unit is configured to construct and send, based on a configuration type of the authentication server to be tested, according to a roaming authentication protocol, roaming authentication protocol data to the authentication server to be tested; capture response data sent by the authentication server to be tested, and perform comparative analysis to determine whether field information in the response data is consistent with the locally stored respective information; and display that the authentication server to be tested is tested successfully in a case that the field information in the response data is completely consistent with the locally stored respective information; otherwise, the monitoring and processing unit displays comparative analysis information.

It can be seen from the above-described embodiment that, in the system for testing the authentication server according to the present disclosure, the monitor console sends, based on a configuration type of the authentication server to be tested, the roaming authentication protocol data to the authentication server to be tested by simulating an access point and the authentication server, the monitor console captures the response data sent by the authentication server to be tested, performs comparative analysis on the response data, determines whether the testing is successful, and displays the comparative analysis information in a case that the testing is unsuccessful, and thus error location can be performed accurately. Hence, compared with the conventional technology, the present disclosure has the following advantages: the related protocol data is captured and completely analyzed so that a test result is more accurate; a testing process includes a complete data capturing analysis, detailed information on the protocol data in the device to be tested may be given so that test data is more complete; and a microtest is performed on an execution process of the protocol so that an error in protocol implementation may be located accurately.

Sixth Embodiment

Figure 5:
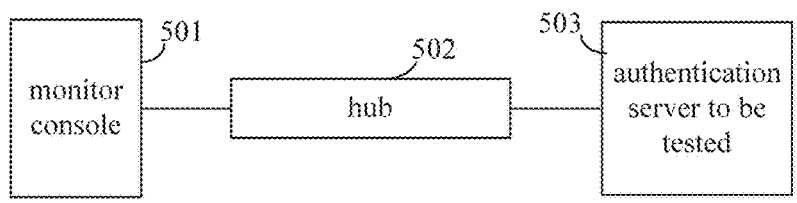
FIG. 5 is a system structure drawing of a system for testing an authentication server according to a sixth embodiment of the present disclosure.

To explain the system for testing the authentication server according to the present disclosure in detail, a system for testing an authentication server is further provided according to the sixth embodiment. Reference is made to a structural diagram of an authentication server system as shown in FIG. 5, which includes a monitor console 501, a hub 502 and an authentication server to be tested 503, where the monitor console 501 and the authentication server to be tested 503 are connected to the hub 502. The monitor console 501 includes a certificate installation unit and a monitoring and processing unit. The certificate installation unit is configured to install a certificate of an authentication server to be tested. The monitoring and processing unit is configured to construct and send, based on a configuration type of the authentication server to be tested, according to a roaming authentication protocol, roaming authentication protocol data to the authentication server to be tested; capture response data sent by the authentication server to be tested, and perform comparative analysis to determine whether field information in the response data is consistent with the locally stored respective information; and display that the authentication server to be tested is tested successfully in a case that the field information in the response data is completely consistent with the locally stored respective information; otherwise, the monitoring and processing unit displays comparative analysis information.

The server to be tested includes a module configured to install a certificate of the monitor console.

The authentication server to be tested 503 is configured to send response data according to a roaming authentication protocol, based on the received roaming authentication protocol data.

Preferably, the monitoring and processing unit may include:

a constructing module configured to construct, based on the configuration type of the authentication server to be tested, a roaming certificate authentication request message, or, construct and send a certificate authentication request message to the authentication server to be tested, where the configuration type of the authentication server to be tested includes a home authentication server, an access authentication server and a center authentication server; a capturing module configured to capture a roaming certificate authentication response message sent by the authentication server to be tested, or, capture a roaming certificate authentication request message sent by the authentication server to be tested; and a comparison module configured to perform comparative analysis to determine whether field information in the roaming certificate authentication response message is consistent with locally stored respective information, and/or, perform comparative analysis to determine whether field information in the roaming certificate authentication request message is consistent with the locally stored respective information.

Preferably, in a case that the authentication server to be tested is configured to be a home authentication server, the monitoring and processing unit may include:

a first constructing module configured to construct and send a roaming certificate authentication request message to the authentication server to be tested;

a first capturing module configured to capture a roaming certificate authentication response message sent by the authentication server to be tested;
a first comparison module configured to perform comparative analysis to determine whether field information in the roaming certificate authentication response message is consistent with the locally stored respective information; and
a first display module configured to display that the authentication server to be tested is tested successfully in a case that all the field information in the first comparison module is consistent with the locally stored respective information; otherwise, the first display module displays comparative analysis information.

Preferably, in a case that the authentication server to be tested is configured to be an access authentication server, the monitoring and processing unit may include:
a second constructing module configured to construct and send a certificate authentication request message to the authentication server to be tested;
a second capturing module configured to capture a roaming certificate authentication request message sent by the authentication server to be tested;
a second comparison module configured to perform comparative analysis to determine whether the roaming certificate authentication request message is consistent with the locally stored respective information;
a third constructing module configured to construct and send a roaming certificate authentication response message to the authentication server to be tested in a case that all the field information in the second comparison module is consistent with the locally stored respective information;
a third capturing module configured to capture a certificate authentication response message sent by the authentication server to be tested;
a third comparison module configured to perform comparative analysis to determine whether field information in the certificate authentication response message is consistent with the locally stored respective information; and
a second display module configured to display that the authentication server to be tested is tested successfully in a case that all the field information in the third comparison module is completely consistent with the locally stored respective information; otherwise, the second display module displays comparative analysis information.

Preferably, in a case that the authentication server to be tested is configured to be a center authentication server, the monitoring and processing unit may include:
a fourth constructing module configured to construct and send a roaming certificate authentication request message to the authentication server to be tested;
a fourth capturing module configured to capture a roaming certificate authentication request message sent by the authentication server to be tested;
a fourth comparison module configured to perform comparative analysis to determine whether field information in the captured roaming certificate authentication request message is consistent with the locally stored respective information;
a fifth constructing module configured to construct and send a roaming certificate authentication response message to the authentication server to be tested in a case that all the field information in the fourth comparison module is consistent with the locally stored respective information;
a fifth capturing module configured to capture a roaming certificate authentication response message sent by the authentication server to be tested;
a fifth comparison module configured to perform comparative analysis to determine whether field information in the captured roaming certificate authentication response message is consistent with the locally stored respective information; and
a third display module configured to display that the authentication server to be tested is tested successfully in a case that all the field information in the fifth comparison module is consistent with the locally stored respective information; otherwise, the third display module displays comparative analysis information.

Preferably, the server to be tested may include a module configured to install a certificate of the monitor console in a case that the monitor console tests the authentication server to be tested.

It can be seen from the above-described embodiment that, in the system for testing the authentication server according to the present disclosure, the monitor console sends the protocol data to the authentication server to be tested by simulating an access point, captures the response data sent by the authentication server to be tested, performs comparative analysis on the response data, determines whether the testing is successful, and displays the comparative analysis information in a case that the testing is unsuccessful, and thus error location can be performed accurately. In the system for testing the authentication server, the related protocol data is captured and completely analyzed so that a test result is more accurate; a testing process includes a complete data capturing analysis, detailed information on the protocol data in the device to be tested may be given so that test data is more complete; and a microtest is performed on an execution process of the protocol so that an error in protocol implementation may be located accurately.

It can be understood by those skilled in the art that all or a part of steps of the above-described embodiment methods may be realized by hardware which is instructed by a computer program. The program may be stored in a computer readable storage medium. The program may include the steps of the above-described method embodiments when being executed. The storage medium may include a magnetic disc, an optical disc, a read only memory (ROM), a random access memory (RAM) and so on.

It should be noted that the relationship terminologies such as "first", "second" and the like are only used herein to distinguish one entity or operation from another, rather than to necessitate or imply that an actual relationship or order exists between the entities or operations. Furthermore, terms of "include", "comprise" or any other variants are intended to be non-exclusive. Therefore, a process, method, article or device including a plurality of elements includes not only the disclosed elements but also other elements that are not clearly enumerated, or also include inherent elements of the process, method, article or device. Unless expressively limited otherwise, the statement "including a . . . " does not exclude the case that other similar elements may exist in the process, method, article or device other than enumerated elements.

The method and the system for testing an authentication server according to the embodiments of the disclosure are introduced in detail above, the principles and implementing ways of the disclosure are clarified with specific examples, and the above illustration of the embodiments is only intended to help to understand the method and core concept of disclosure. In addition, those skilled in the art may make some changes to the specific embodiments and the application scope based on the concept of the disclosure. In summary, the specification should not be construed as limiting the disclosure.

The invention claimed is:

1. A method for testing an authentication server, comprising:
installing a certificate of an authentication server to be tested in a monitor console and installing a certificate of the monitor console in the authentication server to be tested, wherein the installation of the certificate of the authentication server to be tested in the monitor console and the installation of the certificate of the monitor console in the authentication server to be tested are used to build a trust relationship between the monitor console and the authentication server to be tested;
constructing and sending, by the monitor console, based on a configuration type of the authentication server to be tested, according to a roaming authentication protocol, roaming authentication protocol data to the authentication server to be tested, wherein the roaming authentication protocol data is constructed based on the certificate of the monitor console which is installed in the authentication server to be tested;
capturing, by the monitor console, response data sent by the authentication server to be tested, and performing, by the monitor console according to the installed certificate of the authentication server to be tested, comparative analysis to determine whether field information in the response data is consistent with locally stored respective information; and
displaying that the authentication server to be tested is tested successfully in a case that the field information in the response data is consistent with the locally stored respective information; otherwise, displaying, by the monitor console, comparative analysis information, wherein in a case that the authentication server to be tested is configured to be an access authentication server, the monitor console constructs and sends a certificate authentication request message to the authentication server to be tested,
the monitor console captures a roaming certificate authentication request message sent by the authentication server to be tested,
the monitor console performs comparative analysis to determine whether the roaming certificate authentication request message is consistent with the locally stored respective information,
the monitor console constructs and sends a roaming certificate authentication response message to the authentication server to be tested in a case that all the field information is consistent with the locally stored respective information,
the monitor console captures a certificate authentication response message sent by the authentication server to be tested, and performs comparative analysis to determine whether field information in the certificate authentication response message is consistent with the locally stored respective information, and
the monitor console displays that the authentication server to be tested is tested successfully in a case that all the field information is consistent with the locally stored respective information; otherwise, the monitor console displays comparative analysis information.

2. The method according to claim 1, wherein in a case that the authentication server to be tested is configured to be a home authentication server, the monitor console constructs and sends a second roaming certificate authentication request message to the authentication server to be tested;
the monitor console captures a second roaming certificate authentication response message sent by the authentication server to be tested;
the monitor console performs comparative analysis to determine whether field information in the second roaming certificate authentication response message is consistent with the locally stored respective information; and
the monitor console displays that the authentication server to be tested is tested successfully in a case that all the field information is consistent with the locally stored respective information; otherwise, the monitor console displays comparative analysis information.

3. The method according to claim 1, wherein in a case that the authentication server to be tested is configured to be a center authentication server, the monitor console constructs and sends a second roaming certificate authentication request message to the authentication server to be tested;
the monitor console captures a second roaming certificate authentication request message sent by the authentication server to be tested;
the monitor console performs comparative analysis to determine whether field information in the captured second roaming certificate authentication request message is consistent with the locally stored respective information;
the monitor console constructs and sends a second roaming certificate authentication response message to the authentication server to be tested in a case that all the field information is consistent with the locally stored respective information;
the monitor console captures a second roaming certificate authentication response message sent by the authentication server to be tested;
the monitor console performs comparative analysis to determine whether field information in the captured second roaming certificate authentication response message is consistent with the locally stored respective information; and
the monitor console displays that the authentication server to be tested is tested successfully in a case that all the field information is consistent with the locally stored respective information; otherwise, the monitor console displays comparative analysis information.

4. A system for testing an authentication server, comprising:
a monitor console, comprising at least one processor and a memory having processor-executable instructions stored therein, and the instructions when executed by the at least one processor, configure the monitor console to:
install a certificate of an authentication server to be tested, wherein a certificate of the monitor console is installed in the authentication server to be tested, and the installation of the certificate of the authentication server to be tested in a monitor console and the installation of the certificate of the monitor console in the authentication server to be tested are used to build a trust relationship between the monitor console and the authentication server to be tested;
construct and send, based on a configuration type of the authentication server to be tested, according to a roaming authentication protocol, roaming authentication protocol data to the authentication server to be tested, wherein the roaming authentication protocol data is constructed based on the certificate of the monitor console which is installed in the authentication server to be tested; capture response data sent by the authentication server to be tested, and perform, according to the installed certificate of the authentication server to be tested, comparative analysis to determine whether field information in the response data is consistent with the locally stored respective information; and display that the authentication server to be tested is tested successfully in a case that the field information in the response data is consistent with the locally stored respective information; otherwise, display comparative analysis information, wherein in a case that the authentication server to be tested is configured to be an access authentication server, the console monitor is further configured to:

construct and send a certificate authentication request message to the authentication server to be tested;

capture a roaming certificate authentication request message sent by the authentication server to be tested;

perform comparative analysis to determine whether the roaming certificate authentication request message is consistent with the locally stored respective information;

construct and send a roaming certificate authentication response message to the authentication server to be tested in a case that all the field information in the second comparison module is consistent with the locally stored respective information;

capture a certificate authentication response message sent by the authentication server to be tested;

perform comparative analysis to determine whether field information in the certificate authentication response message is consistent with the locally stored respective information; and display that the authentication server to be tested is tested successfully in a case that all the field information is consistent with the locally stored respective information; otherwise, display comparative analysis information.

5. The system according to claim 4, wherein in a case that the authentication server to be tested is configured to be a home authentication server, the monitor console is further configured to:

construct and send a second roaming certificate authentication request message to the authentication server to be tested;

capture a second roaming certificate authentication response message sent by the authentication server to be tested;

perform comparative analysis to determine whether field information in the second roaming certificate authentication response message is consistent with the locally stored respective information; and display that the authentication server to be tested is tested successfully in a case that all the field information in the first comparison module is consistent with the locally stored respective information; otherwise, display comparative analysis information.

6. The system according to claim 4, wherein in a case that the authentication server to be tested is configured to be a center authentication server, the monitor console is further configured to:

construct and send a second roaming certificate authentication request message to the authentication server to be tested;

capture a second roaming certificate authentication request message sent by the authentication server to be tested;

perform comparative analysis to determine whether field information in the captured second roaming certificate authentication request message is consistent with the locally stored respective information;

construct and send a second roaming certificate authentication response message to the authentication server to be tested in a case that all the field information in the fourth comparison module is consistent with the locally stored respective information;

capture a second roaming certificate authentication response message sent by the authentication server to be tested;

perform comparative analysis to determine whether field information in the captured second roaming certificate authentication response message is consistent with the locally stored respective information; and display that the authentication server to be tested is tested successfully in a case that all the field information in the fifth comparison module is consistent with the locally stored respective information; otherwise, display comparative analysis information.

7. The system according to claim 4, wherein the server to be tested comprises a second processor and a second memory storing second instructions, and the second instructions when executed by the second processor configure the server to install a certificate of the monitor console in a case that the monitor console tests the authentication server to be tested.

8. The system according to claim 5, wherein the server to be tested comprises a second processor and a second memory storing second instructions, and the second instructions when executed by the second processor configure the server to install a certificate of the monitor console in a case that the monitor console tests the authentication server to be tested.

9. The system according to claim 6, wherein the server to be tested comprises a second processor and a second memory storing second instructions, and the second instructions when executed by the second processor configure the server to install a certificate of the monitor console in a case that the monitor console tests the authentication server to be tested.

10. A method for testing an authentication server, comprising:

installing a certificate of an authentication server to be tested in a monitor console and installing a certificate of the monitor console in the authentication server to be tested, wherein the installation of the certificate of the authentication server to be tested in a monitor console and the installation of the certificate of the monitor console in the authentication server to be tested are used to build a trust relationship between the monitor console and the authentication server to be tested;

constructing and sending, by the monitor console, based on a configuration type of the authentication server to be tested, according to a roaming authentication protocol, roaming authentication protocol data to the authentication server to be tested, wherein the roaming authentication protocol data is constructed based on the certificate of the monitor console which is installed in the authentication server to be tested;

capturing, by the monitor console, response data sent by the authentication server to be tested, and performing, by the monitor console according to the installed certificate of the authentication server to be tested, comparative analysis to determine whether field information in the response data is consistent with locally stored respective information; and displaying that the authentication server to be tested is tested successfully in a case that the field information in the response data is consistent with the locally stored respective information; otherwise, displaying, by the monitor console, comparative analysis information, wherein in a case that the authentication server to be tested is configured to be a center authentication server, the monitor console constructs and sends a roaming certificate authentication request message to the authentication server to be tested, the monitor console captures a roaming certificate authentication request message sent by the authentication server to be tested, the monitor console performs comparative analysis to determine whether field information in the captured roaming certificate authentication request message is consistent with the locally stored respective information, the monitor console constructs and sends a roaming certificate authentication response message to the authentication server to be tested in a case that all the field information is consistent with the locally stored respective information, the monitor console captures a roaming certificate authentication response message sent by the authentication server to be tested, the monitor console performs comparative analysis to determine whether field information in the captured roaming certificate authentication response message is consistent with the locally stored respective information, and the monitor console displays that the authentication server to be tested is tested successfully in a case that all the field information is consistent with the locally stored respective information; otherwise, the monitor console displays comparative analysis information.

* * * * *